United States Patent
Takeichi

(10) Patent No.: US 11,808,620 B2
(45) Date of Patent: Nov. 7, 2023

(54) LOAD CELL UNIT WITH TEMPERATURE COMPENSATION AND WEIGHING EQUIPMENT INCLUDING THE LOAD CELL UNIT

(71) Applicant: Ishida Co., Ltd., Kyoto (JP)

(72) Inventor: Shinji Takeichi, Ritto (JP)

(73) Assignee: Ishida Co., Ltd., Kyoto (JP)

(*) Notice: Subject to any disclaimer, the term of this patent is extended or adjusted under 35 U.S.C. 154(b) by 238 days.

(21) Appl. No.: 17/199,183

(22) Filed: Mar. 11, 2021

(65) Prior Publication Data

US 2021/0293610 A1  Sep. 23, 2021

(30) Foreign Application Priority Data

Mar. 19, 2020 (JP) ................................. 2020-050068

(51) Int. Cl.
*G01G 23/48* (2006.01)
*G01G 21/00* (2006.01)
*G01G 3/18* (2006.01)

(52) U.S. Cl.
CPC .............. *G01G 23/48* (2013.01); *G01G 3/18* (2013.01); *G01G 21/00* (2013.01)

(58) Field of Classification Search
CPC ........... G01G 3/18; G01G 21/00; G01G 23/48
USPC ........................................................ 177/229
See application file for complete search history.

(56) References Cited

U.S. PATENT DOCUMENTS 5,623,128 A * 4/1997 Grimm ..................... G01G 3/18
177/229
6,173,619 B1 * 1/2001 Satake ................... G01L 1/2281
73/862.622

FOREIGN PATENT DOCUMENTS

| CN | 1077025 A | 10/1993 |
|---|---|---|
| CN | 1089352 A | 7/1994 |
| CN | 1190737 A | 8/1998 |
| CN | 101603849 A | 12/2009 |
| CN | 207163561 U | 3/2018 |
| DE | 103 53 414 B3 | 1/2005 |
| DE | 10 2008 064163 A1 | 7/2010 |
| EP | 2 060 884 A1 | 5/2009 |
| JP | 2008-116393 A | 5/2008 |
| JP | 2010091325 A | 4/2010 |
| JP | 2010-169511 A | 8/2010 |
| JP | 2014-122870 A | 7/2014 |
| WO | 2018/001886 A1 | 1/2018 |

OTHER PUBLICATIONS

Computer translation of JP 2010-091325 downloaded from the JPO website on Mar. 11, 2023.*

(Continued)

*Primary Examiner* — Randy W Gibson
(74) *Attorney, Agent, or Firm* — Studebaker & Brackett PC

(57) ABSTRACT

A load cell unit includes: a load cell that is provided with a distortional member including a free-end block, a fixed-end block, an upper beam portion connecting an upper end of the free-end block and an upper end of the fixed-end block, and a lower beam portion connecting a lower end of the free-end block and a lower end of the fixed-end block; a first temperature sensor that is disposed at the upper beam portion or the lower beam portion; and a second temperature sensor that is disposed at one of the free-end block and the fixed-end block.

11 Claims, 11 Drawing Sheets

(56) References Cited

OTHER PUBLICATIONS

The extended European search report issued by the European Patent Office dated Jul. 28, 2021, which corresponds to European Patent Application No. 21162905.0-1001 and is related to U.S. Appl. No. 17/199,183.

* cited by examiner

LOAD CELL UNIT WITH TEMPERATURE COMPENSATION AND WEIGHING EQUIPMENT INCLUDING THE LOAD CELL UNIT

TECHNICAL FIELD

An aspect of the invention relates to a load cell unit and weighing equipment.

BACKGROUND

In the related art, a load cell unit described in Japanese Unexamined Patent Publication No. 2010-91325 is known. In the load cell unit described in Japanese Unexamined Patent Publication No. 2010-91325, in order to curb variation of a weighing signal due to a change in temperature of a distortional member, a temperature sensor is provided in the distortional member and the weighing signal is compensated for based on a temperature detected by the temperature sensor.

SUMMARY

In such a load cell unit, a temperature distribution of the distortional member may become unbalanced (unsteady), but this unbalanced state may not be sufficiently considered in compensation for an output of a load cell and thus stable high-precision weighing may be difficult.

Therefore, an aspect of the invention provides a load cell unit and weighing equipment that can realize stable high-precision weighing.

According to an aspect of the invention, there is provided a load cell unit including: a load cell that is provided with a distortional member including a free-end block, a fixed-end block, an upper beam portion connecting an upper end of the free-end block and an upper end of the fixed-end block, and a lower beam portion connecting a lower end of the free-end block and a lower end of the fixed-end block; a first temperature sensor that is disposed at the upper beam portion or the lower beam portion; and a second temperature sensor that is disposed at one of the free-end block and the fixed-end block.

In the load cell unit, a representative temperature of the load cell as a whole can be detected by the first temperature sensor. Accordingly, it is possible to perform temperature compensation based on the representative temperature of the load cell as a whole on an output of the load cell. Temperatures at two positions of the distortional member can be acquired by the first temperature sensor and the second temperature sensor. Accordingly, it is possible to acquire (calculate) a temperature difference (thermal imbalance) which occurs in the distortional member and to perform temperature compensation based on the temperature difference, that is, temperature compensation in consideration of a temperature distribution in an unbalanced state, on the output of the load cell. As a result, with the load cell unit, it is possible to realize stable high-precision weighing.

In the load cell unit according to the aspect of the invention, the first temperature sensor and the second temperature sensor may be provided together on one of a top surface and a bottom surface of the distortional member. With this configuration, it is easy to simply construct wires from the temperature sensors. In comparison with a case in which the temperature sensors are provided on side surfaces of the distortional member, wires are less likely to interfere with distortion of the distortional member, and a bad influence on weighing precision can be minimized. Since the distortional member generally has a symmetric structure, it is possible to acquire a stable temperature change without being affected by noise due to a temperature difference between the top surface and the bottom surface by providing the first temperature sensor and the second temperature sensor on the same surface together.

In the load cell unit according to the aspect of the invention, the first temperature sensor and the second temperature sensor may be disposed at the center of the distortional member in a width direction crossing a direction from the free-end block to the fixed-end block and crossing a vertical direction. With this configuration, the first temperature sensor and the second temperature sensor can detect an average temperature of the distortional member in the width direction.

The load cell unit according to the aspect of the invention may further include a third temperature sensor that is provided on the other of the free-end block and the fixed-end block. With this configuration, in addition to the temperature difference between two positions on the distortional member acquired from the first temperature sensor and the second temperature sensor, a temperature difference between two positions on the distortional member can be additionally acquired from the first temperature sensor and the third temperature sensor. Accordingly, it is possible to perform temperature compensation based on the temperature differences on the output of the load cell and to realize more stable high-precision weighing.

In the load cell unit according to the aspect of the invention, the load cell may include a sensor unit that outputs a weighed value based on an amount of distortion of the distortional member as an analog value, and the load cell unit may further include: a converter unit that converts the analog value output from the sensor unit to a digital value; and a temperature difference compensating unit that performs temperature compensation in an unbalanced state on the digital value acquired from the converter unit based on a temperature difference between a first temperature detected by the first temperature sensor and a second temperature detected by the second temperature sensor. With this configuration, it is possible to perform temperature compensation in an unbalanced state based on the temperature differences of the distortional member.

The load cell unit according to the aspect of the invention may further include a temperature compensating unit that performs temperature compensation in a steady state on the digital value which is acquired from the converter unit and which is not yet compensated for by the temperature difference compensating unit on the basis of the first temperature. With this configuration, the temperature compensating unit can perform temperature compensation in a steady state based on the first temperature which is a representative temperature of the load cell. Here, the temperature compensation by the temperature compensating unit is mainly to compensate for unevenness of an output in a thermal equilibrium state, and the temperature compensation by the temperature difference compensating unit is mainly to compensate for unevenness of an output in a thermal non-equilibrium state. Accordingly, with this configuration, it is possible to simply separate both adjustments.

The load cell unit according to the aspect of the invention may further include: a sensor unit that outputs a weighed value based on an amount of distortion of the distortional member as an analog value; a converter unit that converts the analog value output from the sensor unit to a digital value; and a temperature difference compensating unit that performs temperature compensation in an unbalanced state on the digital value acquired from the converter unit based on a temperature difference between a first temperature detected by the first temperature sensor and a second temperature detected by the second temperature sensor and a temperature difference between the first temperature and a third temperature detected by the third temperature sensor. With this configuration, it is possible to perform temperature compensation in an unbalanced state based on the temperature differences of the distortional member.

The load cell unit according to the aspect of the invention may further include a temperature compensating unit that performs temperature compensation in a steady state on the digital value which is acquired from the converter unit and which is not yet compensated for by the temperature difference compensating unit on the basis of the first temperature. With this configuration, the temperature compensating unit can perform temperature compensation in a steady state based on the first temperature which is a representative temperature of the load cell. Here, the temperature compensation by the temperature compensating unit is mainly to compensate for unevenness of an output in a thermal equilibrium state, and the temperature compensation by the temperature difference compensating unit is mainly to compensate for unevenness of an output in a thermal non-equilibrium state. Accordingly, with this configuration, it is possible to simply separate both adjustments.

In the load cell unit according to the aspect of the invention, the second temperature sensor may be disposed at one of the free-end block and the fixed-end block that is closer to a heat source. With this configuration, it is possible to immediately detect heat conduction of a heat source and to perform early compensation for thermal non-equilibrium which occurs in the distortional member due to the heat source.

In the load cell unit according to the aspect of the invention, the second temperature sensor may be disposed at the fixed-end block. In general, wires which are provided in the distortional member often gather on the fixed-end block side. Accordingly, when the second temperature sensor is disposed at the fixed-end block, at least a wire from the second temperature sensor can be further prevented from interfering with the upper beam portion or the lower beam portion in comparison with a case in which the second temperature sensor is disposed at the free-end block. Specifically, it is possible to curb extending of the wires over a flexible part (a thin part) of the distortional member and to exclude an influence of the wires on weighing precision.

According to another aspect of the invention, there is provided weighing equipment including: the aforementioned load cell unit; a transportation conveyer that transports an article which is to be weighed in a state in which the article is placed on a transportation surface; a drive unit that drives the transportation conveyer; a first frame unit that supports the transportation conveyer and the drive unit; a leg unit; and a second frame unit that is supported by the leg unit, wherein the free-end block is connected to the first frame unit and a weight of the article transported by the transportation conveyer is applied thereto, the fixed-end block is connected to the second frame unit, and the second temperature sensor is disposed at the free-end block.

According to another aspect of the invention, there is provided weighing equipment including: the aforementioned load cell unit; a hopper unit that includes a gate, temporarily holds an article which is input from outside, and then discharges the article; a support that supports the hopper unit; a drive unit that drives the gate to be opened and closed; and a main body that accommodates the drive unit therein, wherein the free-end block is connected to the support and a weight of the article held in the hopper unit is applied thereto, the fixed-end block is connected to the main body, and the second temperature sensor is disposed at the fixed-end block.

Since this weighing equipment includes the aforementioned load cell unit, it is possible to realize stable high-precision weighing.

DETAILED DESCRIPTION

Figure 1:
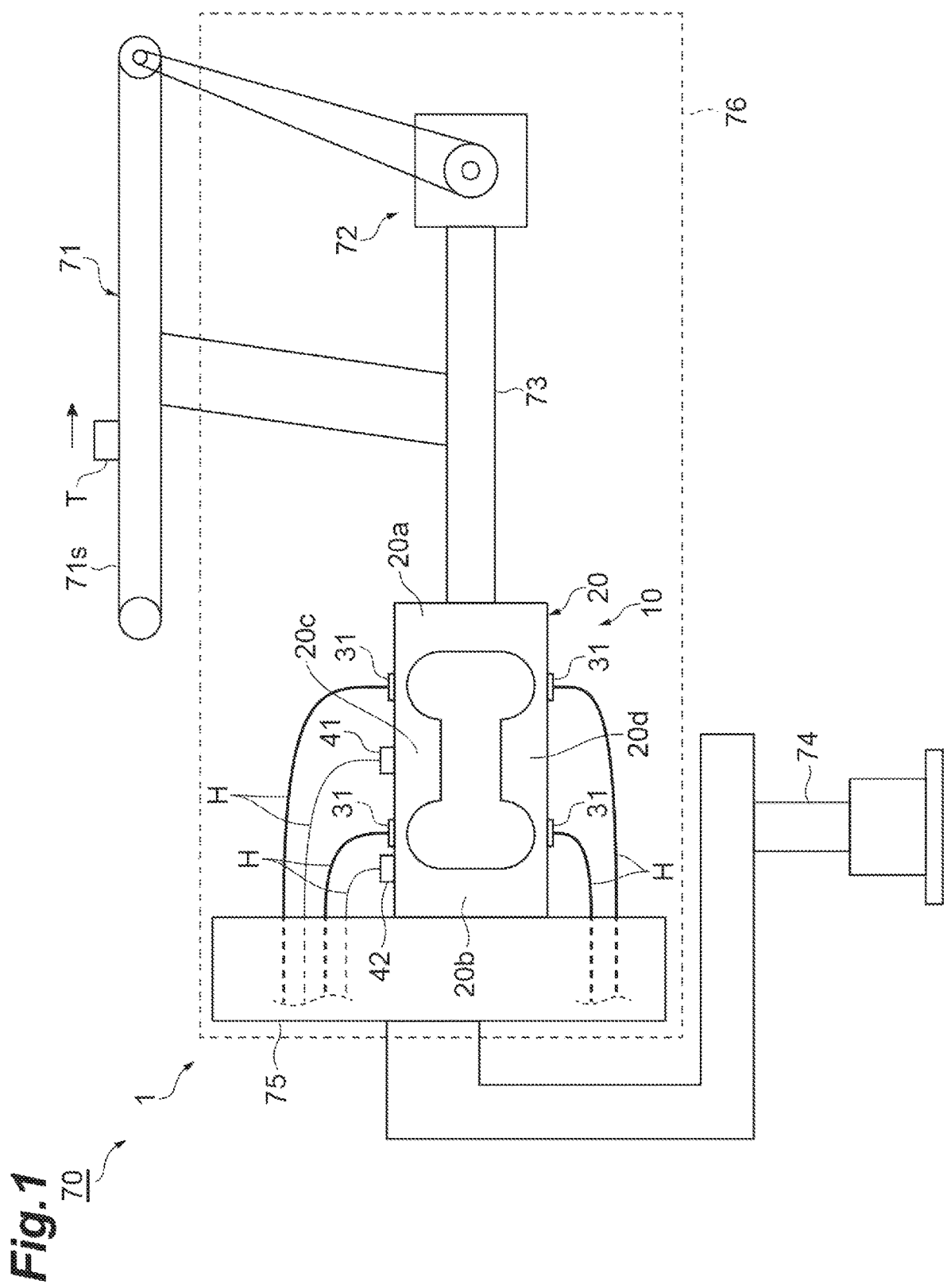
FIG. 1 is a diagram illustrating a configuration of weighing equipment according to a first embodiment.

Hereinafter, embodiments will be described with reference to the accompanying drawings. In the drawings, the same or corresponding elements will be referred to by the same reference signs and description thereof will not be repeated. The terms "up" and "down" correspond to up and down in a vertical direction.

First Embodiment

Figure 2:
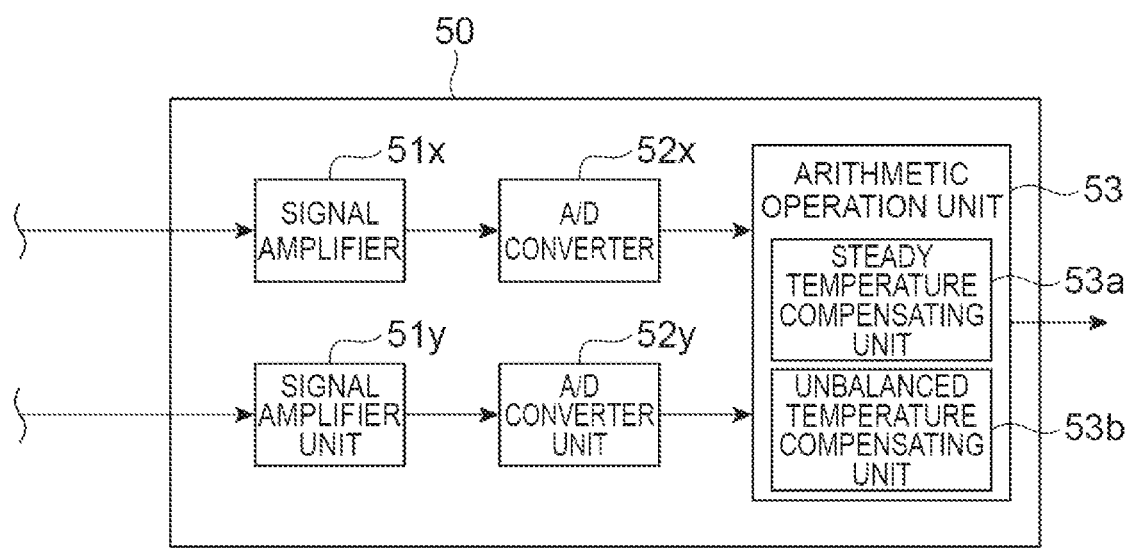
FIG. 2 is a block diagram illustrating a weighing signal processing board of a load cell unit illustrated in FIG. 1.
Figure 3:
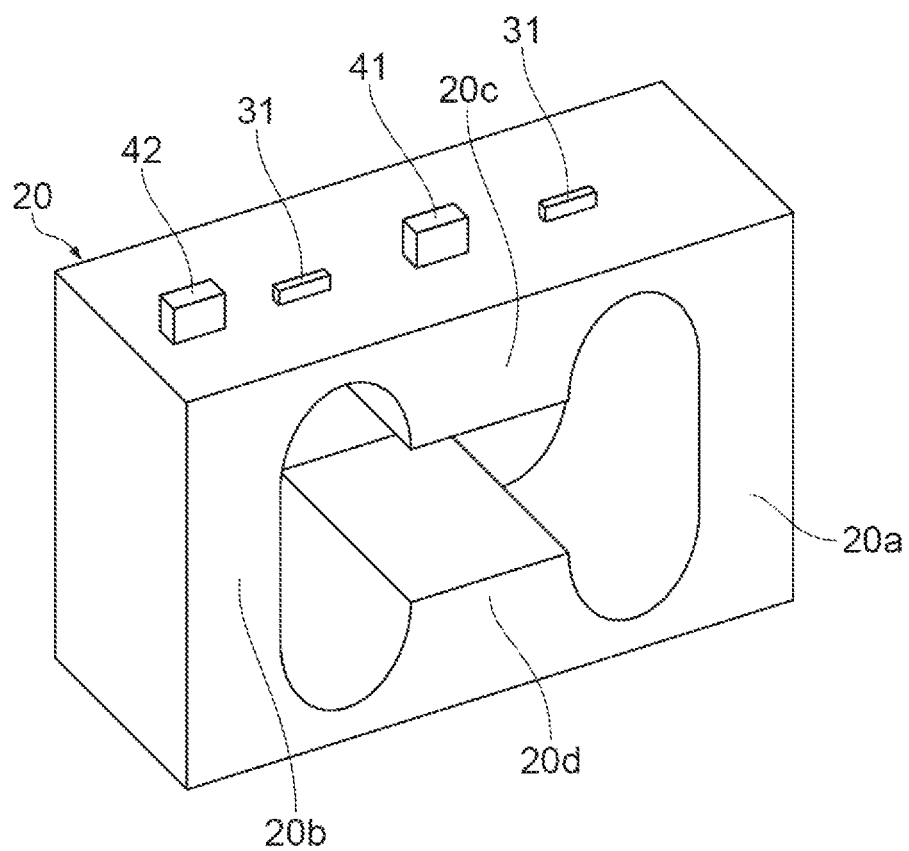
FIG. 3 is a perspective view illustrating a distortional member of the load cell unit illustrated in FIG. 1.
Figure 4:
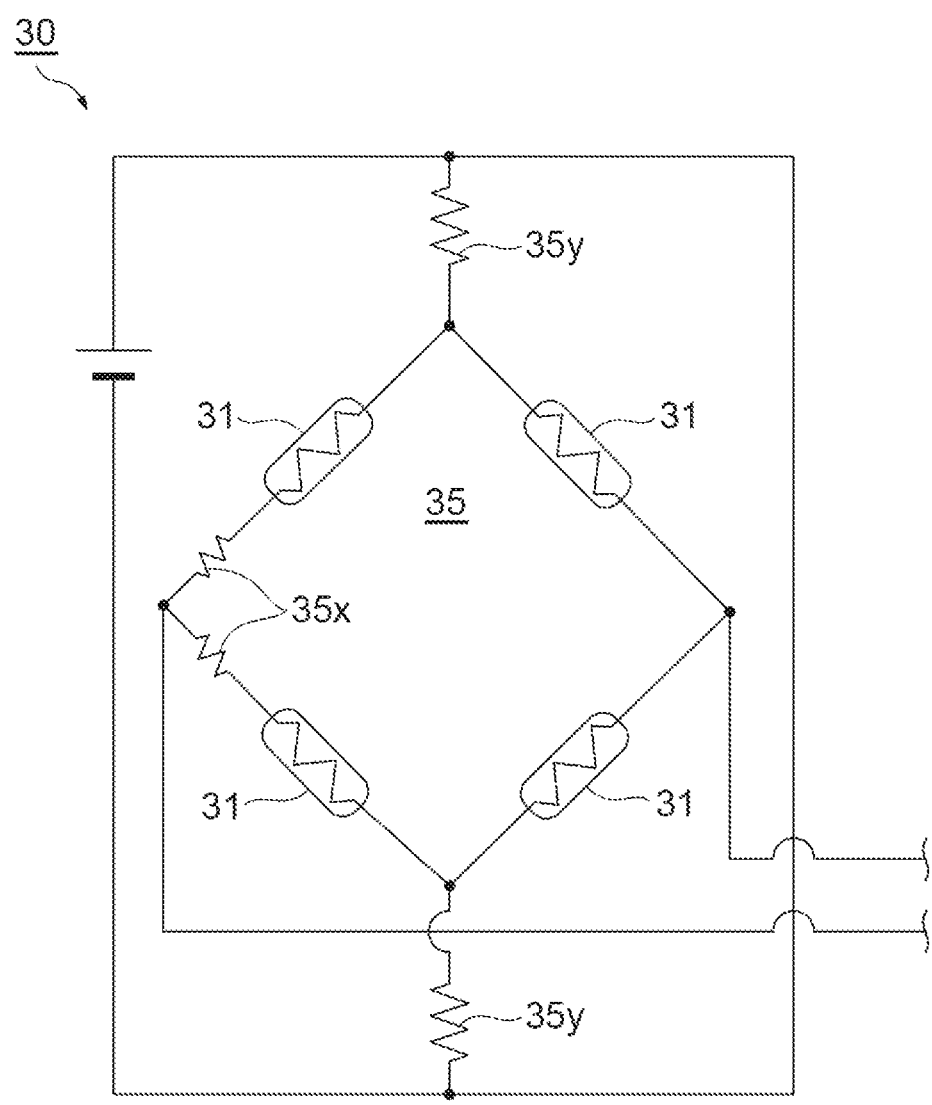
FIG. 4 is a circuit diagram schematically illustrating a sensor unit of the load cell unit illustrated in FIG. 1.

FIG. 1 is a diagram illustrating a configuration of weighing equipment 70. FIG. 2 is a block diagram illustrating a configuration of a load cell unit 1. FIG. 3 is a perspective view illustrating a distortional member 20 of the load cell unit 1. FIG. 4 is a circuit diagram schematically illustrating a sensor unit 30 of the load cell unit 1. The weighing equipment 70 illustrated in FIG. 1 measures a weight of an article T while transporting the article T from upstream to downstream.

The weighing equipment 70 includes a load cell unit 1, a transportation conveyer 71 that transports an article T which is to be weighed while placing the article T on a transportation surface 71s, a drive unit 72 that drives the transportation conveyer 71, a first frame unit 73 that supports the transportation conveyer 71 and the drive unit 72, a leg unit 74, and a second frame unit 75 that is supported by the leg unit 74. The transportation conveyer 71 is not particularly limited and various conveyers can be employed. The drive unit 72 includes, for example, a motor. The load cell unit 1 is accommodated in a weighing box 76 of the weighing equipment 70. The load cell unit 1 includes a load cell 10, a first temperature sensor 41, a second temperature sensor 42, and a weighing signal processing board 50.

As illustrated in FIGS. 1, 2, and 3, a load cell 10 is a device that acquires a weighing signal (a weighed value) according to a weight of an article T. The load cell 10 includes a distortional member 20 and a sensor unit 30. The distortional member 20 has a shape like a rectangular block. The distortional member 20 includes a so-called Roberval mechanism. The distortional member 20 is formed by forming a through-hole in a metal block of an aluminum alloy, stainless steel, or the like, and has a symmetric structure.

The distortional member 20 includes a free-end block 20a, a fixed-end block 20b, an upper beam portion 20c that connects an upper end of the free-end block 20a and an upper end of the fixed-end block 20b, and a lower beam portion 20d that connects a lower end of the free-end block 20a and a lower end of the fixed-end block 20b. The distortional member 20 is characterized in that it is distorted in substantially a parallelogram shape according to a load applied to the free-end block 20a. The free-end block 20a is connected to the first frame unit 73 and a weight of an article T which is transported by the transportation conveyer 71 is applied thereto. The fixed-end block 20b is connected to the second frame unit 75. The free-end block 20a and the fixed-end block 20b have substantially the same size. The first temperature sensor 41 is disposed at the upper beam portion 20c. The shape of at least the upper beam portion 20c in which the first temperature sensor 41 is disposed is symmetric with respect to the center of four notched parts (which is symmetric in a width direction and also symmetric in a lateral direction in which the upper beam portion 20c extends).

The sensor unit 30 includes four strain gauge 31 and outputs a weighing signal corresponding to an amount of distortion of the distortional member 20 as an analog value. The strain gauges 31 are provided on top surfaces of two notched parts (thin parts, flexible parts) of the upper beam portion 20c and bottom surfaces of two notched parts of the lower beam portion 20d. The four strain gauges 31 constitute a bridge circuit 35, and a weighing signal corresponding to an amount of distortion is output from the bridge circuit 35 when the distortional member 20 is distorted. In the bridge circuit 35, a resistance wire 35x having a temperature coefficient is inserted into a Wheatstone bridge and thus compensation for a zero-point drift of compensating for a bridge balance is performed. In the bridge circuit 35, a thermosensitive resistor 35y for adjusting a voltage which is applied to the Wheatstone bridge with a change in a Young's modulus of the distortional member 20 is provided and compensation for output sensitivity is performed.

The first temperature sensor 41 is a temperature sensor that is disposed at the upper beam portion 20c. The second temperature sensor 42 is a temperature sensor that is disposed at the fixed-end block 20b. The first temperature sensor 41 and the second temperature sensor 42 are disposed together on the top surface of the distortional member 20. The first temperature sensor 41 and the second temperature sensor 42 are disposed at the center in a width direction of the distortional member 20. The width direction is a direction which is perpendicular to a direction from the free-end block 20a to the fixed-end block 20b and perpendicular to a vertical direction. The first temperature sensor 41 and the second temperature sensor 42 are constituted, for example, by a thermosensitive resistor (a temperature measuring element) of which a resistance value changes depending on the temperature.

Compensation using such a thermosensitive resistor can decrease a variation width (a dynamic range) of an output before A/D conversion which will be described later is performed. The variation width cannot be completely compensated for using only the thermosensitive resistor, but a value after A/D conversion (a so-called count value) which is assigned to the variation width of an output which is to be compensated for by the weighing signal processing board 50 in the subsequent stage can be assigned with a smaller variation by decreasing the variation width. Accordingly, this is a configuration for improving a resolution of the variation of an output which is to be compensated for and improving compensation precision. Compensation using a thermosensitive resistor is not an essential configuration. Providing of a thermosensitive resistor may be omitted as long as compensation with necessary precision is possible using only the weighing signal processing board 50.

The weighing signal processing board 50 is a board that performs processes such as amplification, A/D conversion, and temperature compensation on a weighing signal output from the load cell 10. The weighing signal processing board 50 includes a signal amplifier 51x, a signal amplifier unit 51y, an A/D converter (converter unit) 52x, an A/D converter unit 52y, and an arithmetic operation unit 53.

The signal amplifier 51x amplifies the weighing signal output from the load cell 10. The signal amplifier unit 51y includes a signal amplifier that amplifies a first temperature signal associated with a first temperature detected by the first temperature sensor 41 and a signal amplifier that amplifies a second temperature signal associated with a second temperature detected by the second temperature sensor 42. The signal amplifiers are connected to the first and second temperature sensors 41 and 42 via wires, respectively. The signal amplifier unit 51y includes the same number of signal amplifiers as the number of temperature sensors provided in the distortional member 20.

The A/D converter 52x converts a weighing signal which is an analog value amplified by the signal amplifier 51x to a weight count x which is a digital value. The A/D converter unit 52y includes an A/D converter that converts the first temperature signal which is an analog value amplified by the signal amplifier unit 51y to a first temperature count t which is a digital value and an A/D converter that converts the second temperature signal which is an analog value amplified by the signal amplifier unit 51y to a second count t1 which is a digital value. The A/D converters are connected to the signal amplifiers of the signal amplifier unit 51y via wires, respectively. The A/D converter unit 52y includes the same number of A/D converters as the number of temperature sensors provided in the distortional member 20.

The arithmetic operation unit 53 includes a balanced temperature compensating unit (temperature compensating unit) 53a and an unbalanced temperature compensating unit (temperature difference compensating unit) 53b. The arithmetic operation unit 53 is constituted, for example, by a central processing unit (CPU) and functions thereof are realized by causing the CPU to operate in accordance with a predetermined program.

The balanced temperature compensating unit 53a performs temperature compensation in a temperature balanced and steady state on the weight count x on the basis of the first temperature count t. In this embodiment, temperature states are classified into three states of a "temperature balanced and steady state," a "temperature unbalanced and steady state," and a "temperature unbalanced and unsteady state." The "temperature balanced and steady state" is a temperature state in which all parts of the distortional member 20 have the same temperature. The "temperature unbalanced and steady state" is a state in which there is a temperature difference between the free-end block 20a and the fixed-end block 20b and the temperature difference does not vary with time. For example, the "temperature unbalanced and steady state" corresponds to a state in which a long time has lapsed after an output (an amount of heat emitted) of a heat source has been stabilized and a temperature distribution does not vary with the elapse of time. The "temperature unbalanced and unsteady state" is a state in which there is a temperature difference between the free-end block 20a and the fixed-end block 20b and the temperature difference varies with time. For example, the "temperature unbalanced and unsteady state" corresponds to a state immediately after power of a heat source has increased (which will be described later) or the like.

Specifically, the balanced temperature compensating unit 53a performs temperature compensation expressed by Expression (1) and calculates a compensated weight count y. In Expression (1), a first half represents a temperature zero-point compensation term, and a second half represents a temperature sensitivity compensation term. In Expression (1), d, e, f, p, q, and r are coefficients which are set in advance. The coefficients can be calculated by changing the temperature of the load cell 10 necessary times using a thermostatic bath or the like and approximating a relationship between the temperature and the output variation in a steady state using a quadratic function.

$$y=(x-dt^2+et+f)*(s/(pt^2+qt+r)) \qquad (1)$$

Expression (1) will be described below in detail.

First, a coefficient for compensating for an output in a state in which no load is applied to the load cell 10 (a state in which it is not distorted due to an external force) is determined. At this time, a right part of a multiplication sign in Expression (1) is set to 1 (is ignored). In a no-load state, outputs at three temperature points (a low temperature, a normal temperature, and a high temperature of which the absolute temperatures are instituted into the expression) are acquired. The temperatures at this time need to be measured in a state in which the load cell 10 is left in a thermostatic bath for a long time at a steady temperature. In general, an apparent output varies, and the coefficients d, e, and f which are constant are determined by correcting the variation. Whether the coefficients d, e, and f are positive or negative depends on individuals at this stage. Accordingly, temperature compensation in the temperature balanced and steady state of a zero point can be performed. The number of temperature points is not limited to three, and may be two or four. When the number of temperature points is n, the left term with respect to the multiplication sign (*) is established as an (n–1)-th-order expression of a temperature t (in this case, the number of coefficients which are constants to be determined is n).

For example, the normal temperature is a temperature of an environment (the outside air temperature) in which the equipment is used. The normal temperature does not need to be strictly equal to that in a place in which the equipment is actually used. For example, the high temperature and the low temperature may be set to be substantially equal to a tolerable temperature range of the load cell 10 or set to temperatures outside (higher or lower than) the range. The difference between the high temperature and the normal temperature and the difference between the low temperature and the normal temperature may be set to be as great as possible in order to enhance accuracy of calculated values. The difference between the high temperature and the normal temperature and the difference between the low temperature and the normal temperature are preferable to be equal to each other. For example, the normal temperature may be set to an average value of the high temperature and the low temperature.

Then, coefficients for compensating for the output in a state in which a load is applied to the load cell 10 (a state in which the load cell 10 is distorted due to an external force) are determined. Here, a constant s is the magnitude of the applied load (the weight) and is not an undetermined multiplier. In the state in which a load is applied thereto, an output value varying from a zero point (a difference from the output at the zero point is a span value) is acquired. Even when the same load is applied, the output value varies depending on the temperature and thus needs to be compensated for. Similarly, outputs at steady three-point temperatures (the low temperature, the normal temperature, and the high temperature which are similarly converted to absolute temperatures) are acquired. Then, the coefficients p, q, and r are acquired. In this case, the order of the expression may be freely determined depending on the number of acquired outputs (the number of measured temperatures). Accordingly, the number of acquired temperatures may be two or four. When the number of acquired temperatures is n, the right term with respect to the multiplication sign (*) is established as (a reciprocal of) an (n–1)-th-order expression of the temperature t (in this case, the number of coefficients which are constants to be determined is n).

In this way, the compensated weight count y (the true value) can be obtained from the weight count x (an apparent value) on the basis of Expression (1). The compensated weight count y accurately compensates for the variation of the output due to the temperature of the load cell 10 under the condition that the temperature of the load cell 10 is in a balanced state. When the temperature of the load cell 10 is unbalanced, it is known that the output additionally varies due to occurrence of a temperature gradient and departs from the true value. Therefore, the unbalanced temperature compensating unit 53b is additionally provided to compensate for departure of the output due to such an unbalance in temperature.

The unbalanced temperature compensating unit 53b performs temperature compensation in an unbalanced state on the compensated weight count y having been subjected to temperature compensation by the balanced temperature compensating unit 53a on the basis of the temperature difference between the first temperature count t and the second temperature count t1. The unbalanced state is a state in which a temperature gradient is generated and which can be caused regardless of whether the state is steady or unsteady. The unbalanced state is a state in which the distortional member 20 has a temperature varying depending on parts thereof and a non-uniform temperature distribution is generated. The unbalanced state includes, for example, a state in which the temperature distribution is dynamic and varies with time. For example, the unbalanced state includes a state in which the equipment starts operation, heat from a heat source (a motor) flows thereto mainly by heat conduction from the heat source, and the temperature increases. In this case, heat on the heat source side is conducted to the opposite side. A temperature gradient in which the temperature on the heat source side is relatively high and the temperature of the opposite side is relatively low is generated. The unbalanced state includes a state in which the temperature distribution is static and does not vary with time. For example, the unbalanced state includes a state in which sufficient time has elapsed after the equipment has been started, the equipment has got warm, and an amount of processed articles has been stabilized. At this time, the temperature on the motor side of the distortional member 20 is higher than that on the opposite side and a temperature gradient is generated, but inflow and outflow of heat are balanced and a temperature variation does not occur. In this embodiment, the unbalanced state includes the "temperature unbalanced and steady state" and the "temperature unbalanced and unsteady state" (in the following description, the same is true of the "unbalanced state").

The unbalanced temperature compensating unit 53*b* specifically performs the temperature compensation expressed by Expression (2) and calculates a weight count y' subjected to unbalanced temperature compensation. In Expression (2), j is a preset coefficient. The coefficient can be calculated by generating an intentional temperature difference in the load cell 10. Heat generated by activating motors can be used to generate the temperature difference. It is also possible to shorten time by intentionally performing heating using a heater or the like. When a compensation expression is set to a linear function as in Expression (2), one set of a temperature difference and an output at the temperature difference is necessary and a compensation coefficient which is a solution can be calculated from simultaneously linear equations. In addition, when the order of the compensation expression becomes higher, compensation precision can be enhanced but the number of pieces of temperature difference data which is necessary can be increased.

$$Y'=y-j*(t1-t) \quad (2)$$

Expression (2) will be described below in detail.

First, a relational expression between the compensated weight count y and the weight count y' subjected to unbalanced temperature compensation is acquired. When a temperature distribution is generated, the output varies and it is assumed that this variation depends on a difference between the temperature of a central part of the distortional member 20 and the temperature of an end thereof. It is assumed that the distortional member 20 has a heat gradient from one end to the other end (accordingly, it is assumed that the temperature of at least one end has only to be measured). Here, a heat gradient is intentionally generated by heating one end, a temperature difference (t–t1) between the central part and the one end is generated, and the coefficient j corresponding to by what this temperature difference causes variation of the output is acquired. When t1=0, the constant term is 0 (included in f at the time of calculating y) and thus an unknown constant is only j. −{j1(t−t1)+j2(t−t1)$^2$} or the like may be prepared by adding a second-order term. In this case, two sets of a temperature difference and an output at the temperature difference are required to determine an undetermined multiplier (whether the values of j, j1, and j2 are positive or negative differs depending on individuals). Intentional setting of an unsteady state requires more time than use of a thermostatic bath in which the setting can be automatically performed by the equipment as determined. Accordingly, the number of temperature differences to be acquired is set to at least one in consideration of labor for preparation. In this way, it is possible to separately adjust the steady state and the unsteady state and to freely set precision (to what order) in the states.

In the load cell unit 1 having the aforementioned configuration, first, rough compensation for the output of the load cell 10 is performed by the aforementioned analog compensation (compensation for a zero-point drift using the resistance wire 35*x* and compensation for output sensitivity using the thermosensitive resistor 35*y*). Then, temperature compensation in a steady state is performed on the output of the load cell 10 on the basis of the first temperature (the representative temperature of the load cell 10 as a whole) detected by the first temperature sensor 41. In addition, temperature compensation in an unbalanced state is performed on the output subjected to the temperature compensation. The representative temperature is a temperature accurately indicating the temperature of two strain gauges 31 on the top surface of the distortional member 20. Verification of how a valid representative temperature is obtained will be described later in detail.

As described above, the load cell unit 1 can detect the representative temperature of the load cell 10 as a whole using the first temperature sensor 41. Accordingly, temperature compensation based on the representative temperature of the load cell 10 as a whole can be performed on the output of the load cell 10. In addition, the temperatures at two positions of the distortional member 20 can be acquired using the first temperature sensor 41 and the second temperature sensor 42. Accordingly, it is possible to acquire (calculate) a temperature difference (thermal imbalance) occurring in the distortional member 20 and to perform temperature compensation based on the temperature difference, that is, temperature compensation in consideration of a temperature distribution in an unbalanced state, on the output of the load cell 10.

As a result, the load cell unit 1 can realize stable high-precision weighing. For example, in general weighing equipment, since a weighed value varies due to heat emitted from various electrical components immediately after it is powered on, it is necessary to provide a predetermined weighing prohibition time until the variation is stabilized. However, in the weighing equipment 70 in which the load cell unit 1 is mounted, it is possible to shorten the time for stabilization and to improve usability by performing the temperature compensation in an unbalanced state.

In the load cell unit 1, the second temperature sensor 42 is disposed at the fixed-end block 20*b*. Wires H provided in the distortional member 20 extend to the fixed-end block 20*b* side and gather therein (see FIG. 1). Accordingly, when the second temperature sensor 42 is disposed at the fixed-end block 20*b*, interference of at least the wire H from the second temperature sensor 42 with the upper beam portion 20*c* or the lower beam portion 20*d* can be further curbed in comparison with a case in which the second temperature sensor 42 is disposed at the free-end block 20*a*. Specifically, it is possible to prevent the wires H from extending over the notched parts (flexible parts, thin parts) of the distortional member 20 and to exclude an influence of the wires H on weighing precision. One reason why the wires H provided in the distortional member 20 gather in the fixed-end block 20*b* is that the weighing signal processing board 50 is provided on the fixed-end block 20*b* side. This is because the weighing signal processing board 50 serves as tare when it is provided on the free-end block 20*a* side and the wires H extending from the weighing signal processing board 50 to the sensor unit 30 interfere with distortion of the distortional member 20.

In the load cell unit 1, the first temperature sensor 41 and the second temperature sensor 42 are provided together on the top surface of the distortional member 20. With this configuration, it is easy to simply construct the wires H from the first temperature sensor 41 and the second temperature sensor 42. In comparison with a case in which the first temperature sensor 41 and the second temperature sensor 42 are provided on the side surfaces of the distortional member 20, the wires H are less likely to interfere with distortion of the distortional member 20, and it is possible to minimize a bad influence on weighing precision. Since the distortional member 20 has a symmetric structure, it is possible to acquire a stable temperature variation without being affected by noise due to a temperature difference between the top surface and the bottom surface by providing the first temperature sensor 41 and the second temperature sensor 42 on the same surface together. The first temperature sensor 41 and the second temperature sensor 42 may be provided together on the bottom surface of the distortional member 20 instead of the top surface of the distortional member 20.

In general, the load cell 10 (the distortional member 20) is used in a state in which the free-end block 20a and the fixed-end block 20b are physically connected to the outside (frames of the equipment or the like). Accordingly, inflow and outflow of heat are caused mainly by heat conduction via connection parts between the free-end block 20a and the fixed-end block 20b. Accordingly, a heat gradient (a temperature difference) is likely to occur mainly in a direction from the free-end block 20a to the fixed-end block 20b. However, a temperature gradient is also generated in the vertical direction depending on whether a heat source is located on the upper side of the free-end block 20a or the fixed-end block 20b or on the lower side thereof. Therefore, in order to more accurately compensate for the temperature gradient due to the heat source, it is preferable to provide the first temperature sensor 41 and the second temperature sensor 42 at the same position in the vertical direction. Here, the first temperature sensor 41 needs to be provided in the upper beam portion 20c or the lower beam portion 20d, and it is difficult to provide the temperature sensors on the side surfaces of the upper beam portion 20c or the lower beam portion 20d due to their small areas. Accordingly, when the first temperature sensor 41 and the second temperature sensor 42 are provided at the same position in the vertical direction, it is preferable to provide both the temperature sensors on the top surface or the bottom surface. When both temperature sensors are provided on the top surface out of the top surface and the bottom surface, it is preferable because an operator can more easily access the temperature sensors at the time of production and at the time of maintenance.

In the load cell unit 1, the first temperature sensor 41 and the second temperature sensor 42 are disposed at the center of the distortional member 20 in the width direction thereof. With this configuration, the first temperature sensor 41 and the second temperature sensor 42 can detect an average temperature of the distortional member 20 in the width direction.

In the load cell unit 1, the load cell 10 includes the sensor unit 30 that outputs a weighing signal corresponding to an amount of distortion of the distortional member 20 as an analog value. The load cell unit 1 includes the A/D converter 52x and the unbalanced temperature compensating unit 53b. The A/D converter 52x converts the weighing signal which is an analog value output from the sensor unit 30 to a weight count x which is a digital value. The unbalanced temperature compensating unit 53b performs temperature compensation in an unbalanced state on the compensated weight count y which is a digital value converted by the A/D converter 52x and which is subjected to the temperature compensation by the balanced temperature compensating unit 53a. With this configuration, it is possible to perform temperature compensation in an unbalanced state based on the temperature difference of the distortional member 20.

The load cell unit 1 includes the balanced temperature compensating unit 53a. The balanced temperature compensating unit 53a performs temperature compensation in a steady state on the weight count x which is a digital value converted by the A/D converter 52x and which has not yet been subjected to the temperature compensation by the unbalanced temperature compensating unit 53b on the basis of the first temperature count t. With this configuration, the temperature compensation in a steady state can be performed on the basis of the first temperature which is the representative temperature of the load cell 10 as a whole by the balanced temperature compensating unit 53a. Here, the temperature compensation performed by the balanced temperature compensating unit 53a is mainly to compensate for a variation of the output in a thermal equilibrium state, and the temperature compensation performed by the unbalanced temperature compensating unit 53b is mainly to compensate for a variation of the output in a thermal non-equilibrium state. Accordingly, with this configuration, it is possible to simply separate both adjustments.

For example, the compensation in a steady state (substantially compensation for an average temperature of the distortional member 20) is compensation using a high-order expression for a temperature (a quadratic equation in which temperatures and outputs at three temperature points need to be measured), and the compensation in an unbalanced state (compensation in consideration of a temperature distribution of the distortional member 20) is compensation using a low-order expression for a temperature (a linear equation in which a temperature difference and an output at one temperature point need to be measured), whereby both can be distinctly separated. In general, as the order of an expression used for compensation becomes higher, compensation precision is enhanced and the number of coefficients to be determined is also increased. That is, the number of processes (a relationship between the temperature and the output to be acquired) of acquiring the output of the sensor unit 30 while changing the temperature of the distortional member 20 in order to adjust the compensation expression increases as compensation using a higher-order expression is performed. In general, it is relatively easy to acquire the output of the sensor unit 30 in a steady state while changing the temperature of the distortional member 20 (because the distortional member has only to be placed in a thermostatic bath for a predetermined time). However, it is relatively difficult to acquire the output of the sensor unit 30 in an unbalanced state while changing the temperature of the distortional member 20 (exactly the temperature difference between the first temperature sensor 41 and the second temperature sensor 42 in this case). Accordingly, when compensation in a steady state and compensation in an unbalanced state are separated as in this embodiment, it is possible to more easily perform appropriate adjustment the compensations in consideration of comparison between required accuracy and adjustment difficulty.

Figure 5:
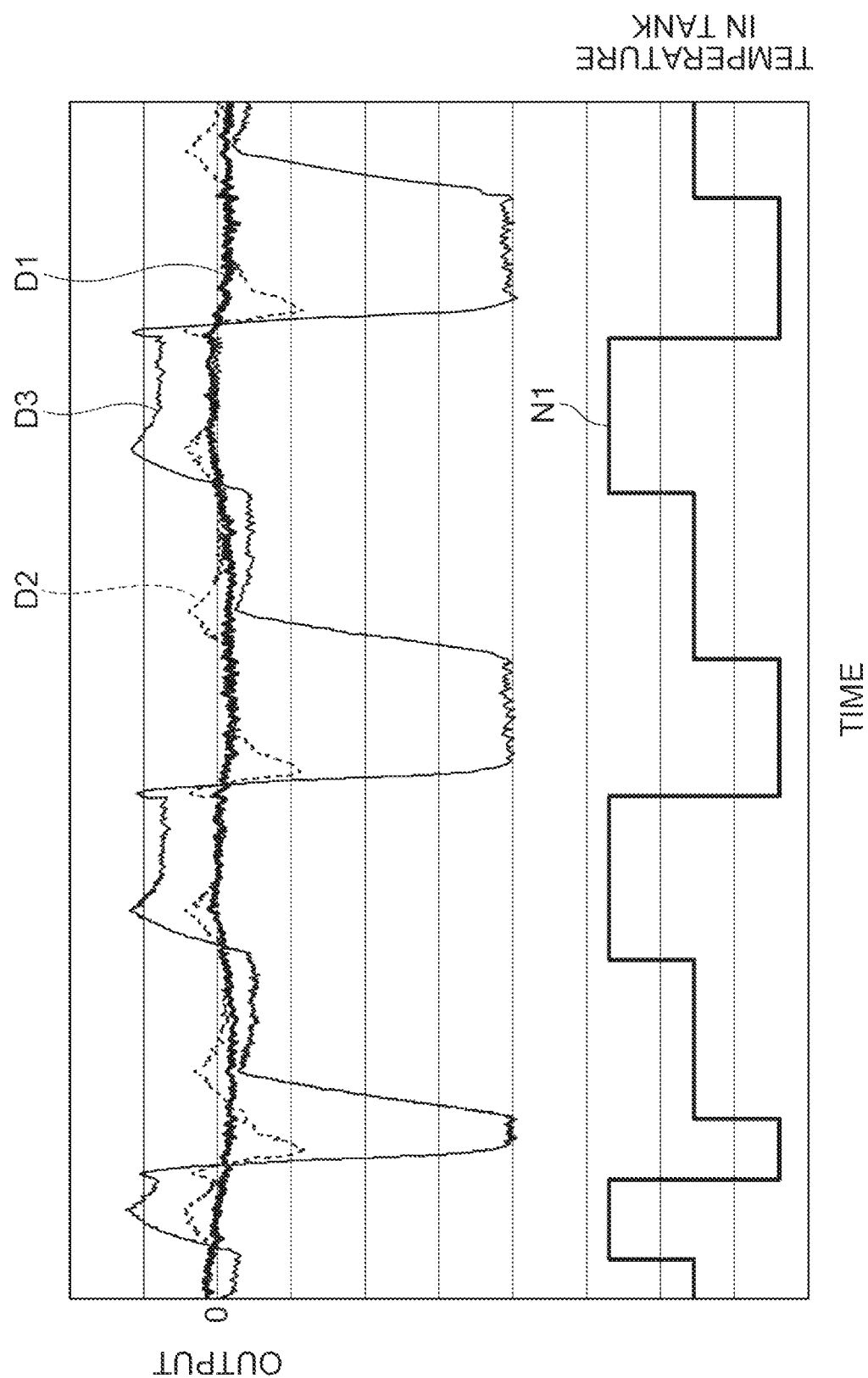
FIG. 5 is a graph illustrating a test result for unevenness of an output with respect to a change in temperature of the load cell unit.

FIG. 5 is a graph illustrating test results associated with a variation in output with respect to a change in temperature of the load cell unit. In the drawing, a waveform D1 indicates a result with the load cell unit 1 according to this embodiment, a waveform D2 indicates a result with a load cell unit according to Comparative Example 1, and a waveform D3 indicates a result with a load cell unit according to Comparative Example 2. The load cell unit according to Comparative Example 1 has the same configuration as the load cell unit 1, except that the second temperature sensor 42 and the unbalanced temperature compensating unit 53b are not provided. The load cell unit according to Comparative Example 2 has the same configuration as the load cell unit 1, except that the first temperature sensor 41, the second temperature sensor 42, the balanced temperature compensating unit 53a and the unbalanced temperature compensating unit 53b are not provided. In the test, various load cell units were set in a thermostatic bath and a bath temperature N1 was changed in a substantially stepped shape of normal temperature→high temperature→low temperature→normal temperature. As illustrated in FIG. 4, when the bath temperature N1 changes suddenly, the waveform D2 and the waveform D3 (Comparative Example 1 and Comparative Example 2) indicate that the output varies temporarily. On the other hand, the output value (the waveform D1) in this embodiment varies less than those in the waveform D2 and the waveform D3. With the load cell unit 1, it can be ascertained that it is possible to greatly curb the variation and to achieve excellent variation improvement.

In the load cell unit 1, the second temperature sensor 42 may be provided in the free-end block 20a. In this case, since a drive unit 72 serving as a heat source is provided on the free-end block 20a side, the free-end block 20a is one side close to a heat source. That is, the second temperature sensor 42 may be provided in the free-end block 20a to which heat from the drive unit 72 serving as a heat source is more conducted than to the fixed-end block 20b. "One side close to a heat source" is a relative concept. When constituents serving as a heat source are disposed on both the free-end block 20a side and the fixed-end block 20b side, the side on which a heat source of a higher temperature is disposed serves as the "one side close to a heat source." With this configuration, it is possible to immediately detect heat conduction from a heat source and to perform early compensation for thermal imbalance occurring in the distortional member 20 due to the heat source.

When the weighing equipment 70 weighs a cold article T, the temperature of the free-end block 20a may decrease suddenly due to the temperature of the cold article T. In this case, when the second temperature sensor 42 is disposed at the free-end block 20a, it is possible to immediately detect heat conduction from the cold article T and to perform early compensation for thermal imbalance occurring in the distortional member 20 due to the cold article T.

In this embodiment, following particular advantages can be achieved in view of precision and in view of adjustment.

In View of Precision

By acquiring a representative temperature of the load cell 10 as a whole using one first temperature sensor 41 which is located between the free-end block 20a and the fixed-end block 20b, it is possible to compensate for a variation in output of the load cell 10 as a whole using the average (representative and substantially median) temperature of the load cell 10 as a whole. It is possible to compensate for a variation in output in an unbalanced state using the second temperature sensor 42 located in one of the free-end block 20a and the fixed-end block 20b.

In a second embodiment, three temperature sensors 41 to 43 are provided. Since the second temperature sensor 42 and the third temperature sensor 43 are located at symmetric positions, the inventor reviewed whether an average temperature of the temperatures detected by the second temperature sensor 42 and the third temperature sensor 43 can be used as a representative temperature. However, as the result of review, the inventor found that the temperature detected by the first temperature sensor 41 rather than the average temperature of the second temperature sensor 42 and the third temperature sensor 43 can be actually used as the actual representative temperature of the load cell 10 (the distortional member 20) as a whole. This will be specifically described below.

Figure 11:
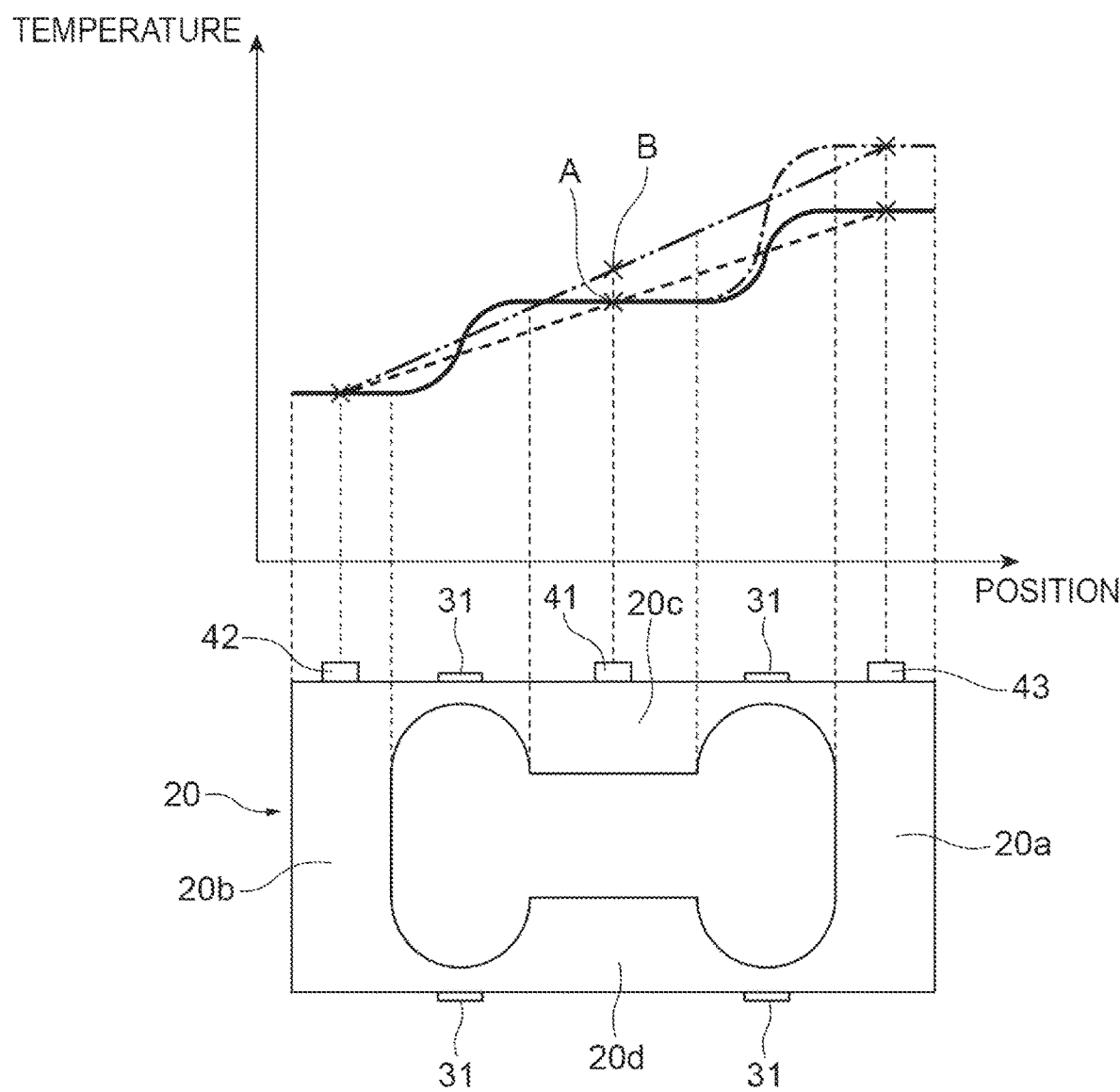
FIG. 11 is a diagram illustrating an example of a relationship between a position and a temperature on a distortional member.

FIG. 11 is a diagram illustrating an example of a relationship between a position and a temperature in the distortional member 20. In the drawing, a solid line indicates the actual temperature of the distortional member 20. Three points "x" in the solid line correspond to the temperature detected by the second temperature sensor 42, the temperature detected by the first temperature sensor 41 (temperature A), and the temperature detected by the third temperature sensor 43, respectively, from the left end in the drawing. A dotted line is a straight line connecting the leftmost point "x" and the rightmost point "x" in the solid line. A one-dot chain line indicates the actual temperature of the distortional member 20 immediately after power of a heat source disposed on the free-end block 20a side has increased (for example, immediately after a rotation speed (an amount of heat emitted from) of a motor has increased). Out of two points "x" in the one-dot chain line, the left point "x" corresponds to the temperature detected by the second temperature sensor 42 immediately after the power of the heat source has increased. The right point "x" corresponds to the temperature detected by the third temperature sensor 43 immediately after the power of the heat source has increased. A two-dot chain line is a straight line connecting the left point "x" and the right point "x" in the one-dot chain line. Out of three points "x" in the two-dot chain line, the middle point "x" corresponds to an average temperature (temperature B) of the temperature detected by the second temperature sensor 42 and the temperature detected by the third temperature sensor 43 immediately after the power of the heat source has increased.

A difference between a case in which temperature compensation of the load cell 10 is performed using the temperature A of the beam portion (the upper beam portion 20c or the lower beam portion 20d) of the distortional member 20 and a case in which temperature compensation of the load cell 10 is performed using the temperature B which is an average temperature at two points of a free end (the free-end block 20a) and a fixed end (the fixed-end block 20b) is as follows. That is, as illustrated in FIG. 11, the temperature gradient of the distortional member 20 is generated due to inflow and outflow of heat of the free end and the fixed end. When heat flows from the free end and heat flows out of the fixed end, the temperature at the free end is higher than that at the fixed end. Heat is conducted from a side with a higher temperature to a side with a lower temperature similarly to electrical resistance, and a temperature decrease is caused due to an influence of a sectional area and a distance of a conduction path. Accordingly, a great temperature decrease occurs particularly in the notched part (thin parts) of the distortional member 20, and a temperature decrease in the free-end or fixed-end block 20a or 20b and the beam portions connecting the notched parts other than the notched parts can be ignored due to their sectional areas much greater than that of the notched parts. This is because an amount of heat moving per unit time increases as the sectional area increases and thus heat can spread widely for a short time and the temperatures become substantially the same (are early balanced). As a result, an amount of heat moving per unit time in the notched part is small, and thus even when a temperature difference is generated with respect to the notched part, heat is not immediately conducted therebetween (between the free-end block 20a and the upper beam portion and between the lower beam portion and the fixed-end block 20b in this embodiment) and the state with a temperature difference is not immediately resolved. On the other hand, an amount of heat moving per unit time is relatively great in the free-end block 20a and the fixed-end block 20b and the beam portions connecting the notched parts (the upper beam portion 20c and the lower beam portion 20d) and thus a temperature difference is resolved for a short time even when the temperature difference occurs (the temperature is balanced in all parts). The strain gauges 31 are attached to the notched parts and, particularly, a temperature decrease at the positions to which the strain gauges 31 are attached becomes greater for the aforementioned reason.

Regarding the temperature A, the temperatures of the beam portions can be considered to be substantially uniform as described above and the temperatures of the strain gauges 31 attached to the notched parts at both ends have values close to the temperatures of the beam portions (which will be described later). On the other hand, regarding the temperature B, in a steady state in which an amount of heat flowing into and from the distortional member 20 is constant and a temperature difference between the free end and the fixed end does not vary, temperature B=temperature A is achieved and the same characteristics as the temperature A are obtained. This is because the distortional member 20 has a shape with high symmetry with respect to the center of four notched parts (a distortion center) and amounts of temperature decrease in the notched parts are the same when seen from a direction in which the beam portions extend when the temperature distribution becomes steady. However, when an amount of heat flowing thereinto and therefrom varies, that is, in an unsteady state, temperature B≠temperature A is achieved and there is a difference from the actual temperature of each strain gauge 31. Accordingly, when the temperature of the beam portion is used as the representative temperature of the load cell 10, it is possible to adapt to all temperature states and to enhance compensation precision. The width of each strain gauge 31 is generally less than the width of each notched part. The strain gauges 31 are partially affected by the temperatures of the beam portions and partially affected by the temperatures of the free-end block 20a and the fixed-end block 20b. In consideration of a contribution ratio of the influences, the temperature of the beam portions is a representative temperature as a whole (a value corresponding to reality close to an average value of the temperature distribution of the load cell 10 as a whole). For these reasons, in comparison with a case in which a total of two temperature sensors including one of each of the free-end block 20a and the fixed-end block 20b are provided, it is possible to improve precision according to the second embodiment.

In View of Adjustment

The temperature compensation in a temperature equilibrium state (temperature compensation in a "temperature balanced and steady state") can be performed on the basis of the first temperature detected by one first temperature sensor 41 located between the free-end block 20a and the fixed-end block 20b and precision thereof can be improved by increasing the number of points at which a temperature is acquired depending on required precision. The temperature compensation in a temperature non-equilibrium state (temperature compensation in a "temperature unbalanced and steady state" and a "temperature unbalanced and unsteady state") can be performed on the basis of the temperature difference between the first temperature sensor 41 and the second temperature sensor 42 and precision thereof can be improved by increasing the number of points at which a temperature is acquired depending on required precision.

The variation in output based on the change in temperature of the distortional member 20 as a whole occupying most of the variation in output can be simply and precisely compensated for using one first temperature sensor 41. The temperature steady state can be easily realized using a thermostatic bath and automation thereof is also possible. In the automation using a thermostatic bath, the load cell 10 is first placed in the thermostatic bath. While changing the temperature of the thermostatic bath, the output of the load cell 10 is acquired at each temperature. For example, which changing the temperature of the thermostatic bath in the order of normal temperature→high temperature→low temperature→normal temperature, the output of the load cell 10 at each temperature is acquired. When the temperature of the thermostatic bath has been changed, it is preferable to acquire the output of the load cell 10 after a sufficient standby time (for example, 5 hours) has elapsed until the temperature of the distortional member 20 is balanced. At this time, in the load cell 10, the fixed-end block 20b is supported (fixed) and a load (specifically, application of a weight) can be applied to or separated (on/off) from the free-end block 20a using a robot arm. Accordingly, by turning on and off a load using the robot arm, it is possible to automatically simultaneously acquire the output of the load cell 10 when the load is applied thereto and the output of the load cell 10 when the load is separated therefrom at each temperature.

Additional adjustable compensation corresponding to a temperature difference (at the time of start of operation, at the time of change of operation settings, and the like) can be adjusted by acquiring the temperatures from the first temperature sensor 41 and the second temperature sensor 42 and calculating a temperature difference therebetween. The temperature adjustment in an unbalanced state (the temperature unbalanced and steady state and the temperature unbalanced and unsteady state) in which adjustment is relatively difficult can be separately performed. The state in which a temperature difference occurs can be intentionally caused, for example, by bringing a heater into contact with one of the free-end block 20a and the fixed-end block 20b. Here, automation thereof is difficult as in acquisition of the output of the load cell 10 in the thermostatic bath. Therefore, by separately performing the temperature adjustment, the number of sets of a value of the temperature difference and a value of the output to be acquired for compensation which is performed in the temperature unbalanced state (the temperature unbalanced and steady state and the temperature unbalanced and unsteady state) can be made to be less than the number of sets of a value of the temperature and a value of the output to be acquired for compensation which is performed in the temperature balanced state (the temperature balanced and steady state). This can be performed by acquiring temperature differences of a necessary number of points according to desired precision.

Second Embodiment

A second embodiment will be described below. In description of this embodiment, only differences from the first embodiment will be described and description thereof will not be repeated.

Figure 6:
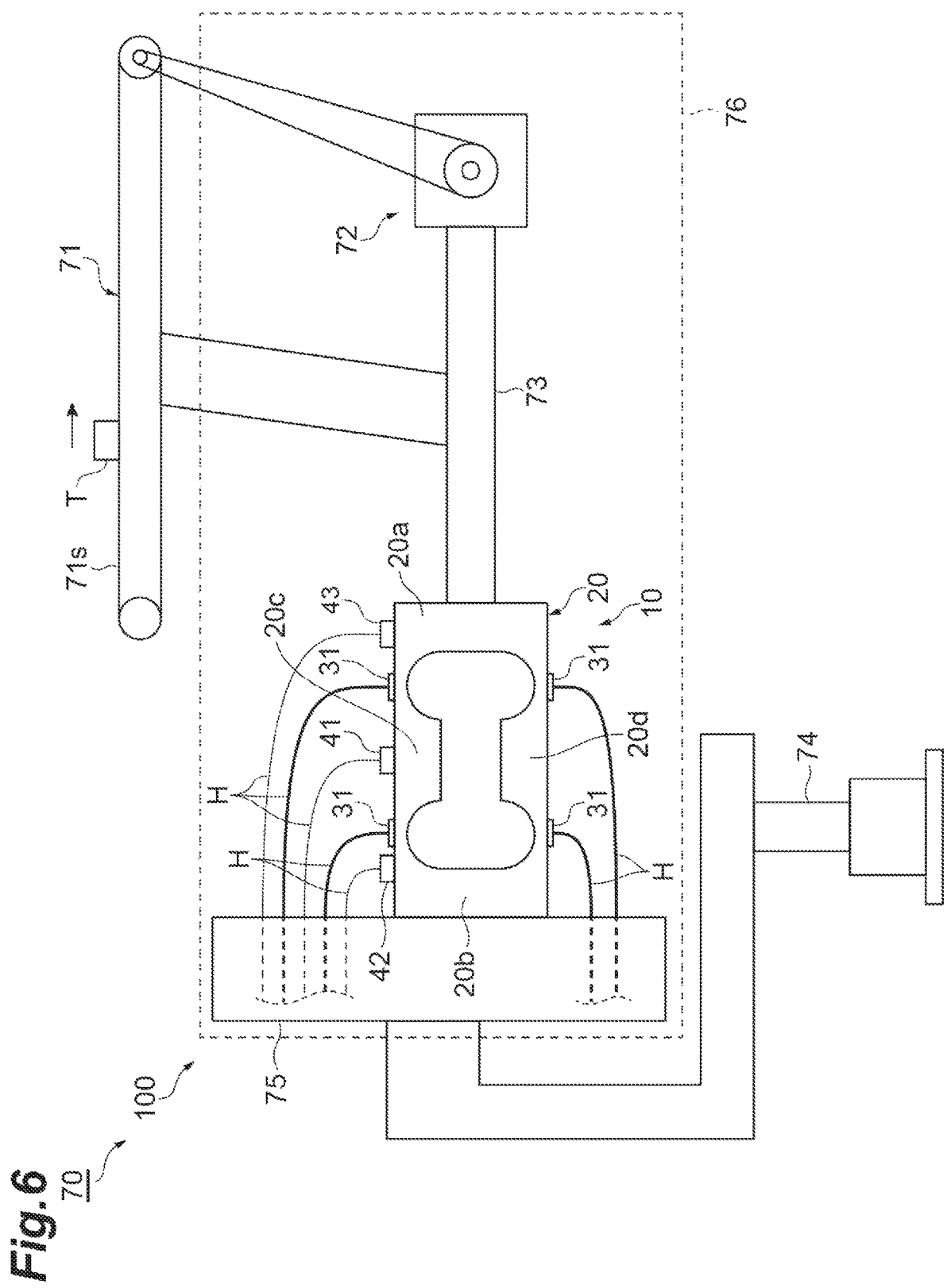
FIG. 6 is a diagram illustrating a configuration of a load cell unit according to a second embodiment.
Figure 7:
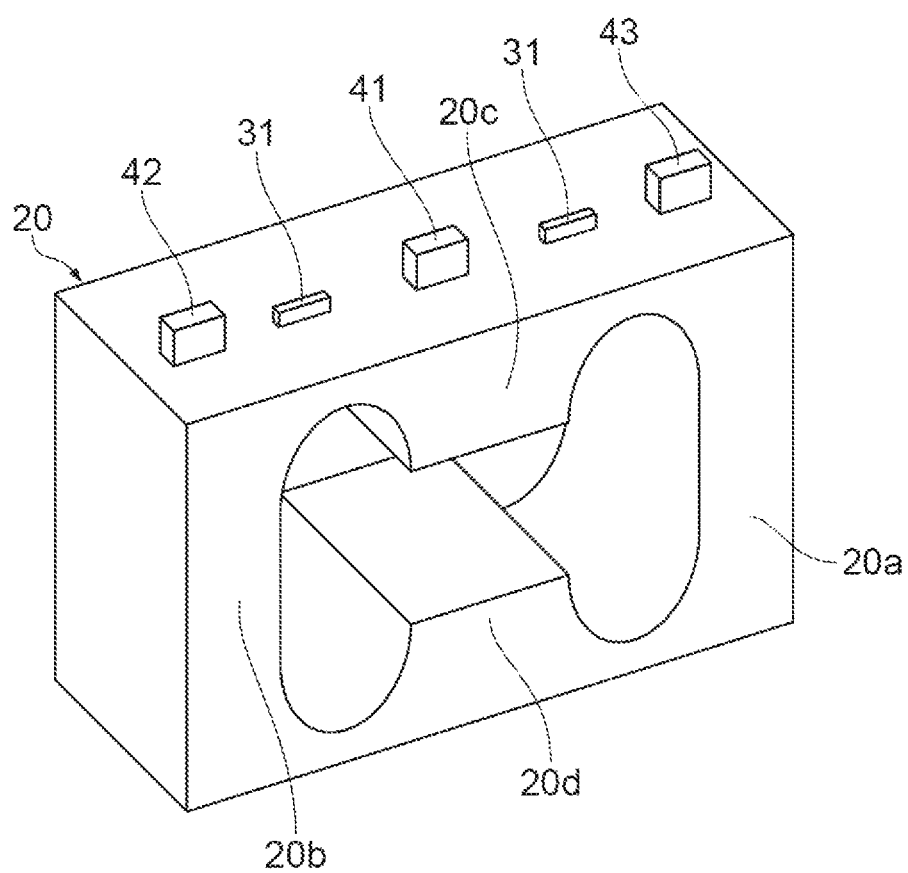
FIG. 7 is a perspective view illustrating a distortional member of the load cell unit illustrated in FIG. 6.

FIG. 6 is a diagram illustrating a configuration of a load cell unit 100. FIG. 7 is a perspective view illustrating a distortional member 20 of the load cell unit 100. As illustrated in FIGS. 6 and 7, the load cell unit 100 is different from the load cell unit 1 (see FIG. 1) in that the third temperature sensor 43 is additionally provided.

The third temperature sensor 43 is a temperature sensor that is provided in the free-end block 20a. The third temperature sensor 43 is provided on the top surface of the distortional member 20. The third temperature sensor 43 is disposed at the center in the width direction of the distortional member 20. The third temperature sensor 43 is constituted, for example, by a thermosensitive resistor (a temperature measuring element) of which a resistance value changes depending on the temperature. The second temperature sensor 42 and the third temperature sensor 43 are disposed at symmetric positions.

The second temperature sensor 42 and the third temperature sensor 43 are disposed at positions in equal distances from the center of four notched parts in the distortional member 20 in a direction from the free-end block 20a to the fixed-end block 20b. This is for compensating for a variation in output due to expansion and contraction of the strain gauges 31 depending on the temperature. The second temperature sensor 42 and the third temperature sensor 43 are disposed at the center of the distortional member 20 in the width direction. This is because a temperature closer to the whole temperature of the distortional member 20 can be detected by the second temperature sensor 42 and the third temperature sensor 43 as it becomes closer to the center.

In this embodiment, the signal amplifier unit 51y amplifies a third temperature signal corresponding to a third temperature detected by the third temperature sensor 43. The A/D converter unit 52y converts the third temperature signal which is an analog value amplified by the signal amplifier unit 51y to a third temperature count t2 which is a digital value.

The unbalanced temperature compensating unit 53b performs temperature compensation in an unbalanced state on a compensated weight count y having been subjected to temperature compensation by the balanced temperature compensating unit 53a on the basis of the temperature difference between the first temperature count t and the second temperature count t1 and the temperature difference between the first temperature count t and the third temperature count t2. For example, the unbalanced temperature compensating unit 53b performs temperature compensation expressed by Expression (3) and calculates a weight count y' subjected to unbalanced temperature compensation.

$$y'=y-j*(t1-t)-k*(t2-t) \quad (3)$$

As Expression (3), for the purpose of compensation with higher precision, an expression in which the number of points at which the temperature difference is acquired is increased to n (where n is an integer equal to or greater than 3) and an (n−1)-th-order term of t1−t and an (n−1)-th-order term of t-2 are added may be used. In this case, more relationships between the temperature difference and the output need to be acquired depending on the order of the temperature differences.

As described above, according to this embodiment, the aforementioned operations and advantages such as realizing stable high-precision weighing can be achieved.

The load cell unit 100 includes the third temperature sensor 43. With this configuration, in addition to the temperature difference between two positions on the distortional member 20 acquired from the first temperature sensor 41 and the second temperature sensor 42, a temperature difference between two positions on the distortional member 20 can be additionally acquired from the first temperature sensor 41 and the third temperature sensor 43. Accordingly, it is possible to perform temperature compensation based on the temperature differences on the output of the load cell 10. It is possible to further curb a variation in output due to a change in temperature and to realize more stable high-precision weighing.

In the load cell unit 100, the unbalanced temperature compensating unit 53b performs temperature compensation in an unbalanced state on the compensated weight count y on the basis of the temperature difference between the first temperature detected by the first temperature sensor 41 and the second temperature detected by the second temperature sensor 42 and the temperature difference between the first temperature detected by the first temperature sensor 41 and the third temperature detected by the third temperature sensor 43. Accordingly, it is possible to perform the temperature compensation in an unbalanced state additionally based on the temperature difference between the first temperature and the third temperature. In the temperature compensation in the unbalanced state, information on what curved shape the temperature distribution of the distortional member 20 has which cannot be ascertained from only the first temperature sensor 41 and the second temperature sensor 42 can be precisely obtained.

Figure 8:
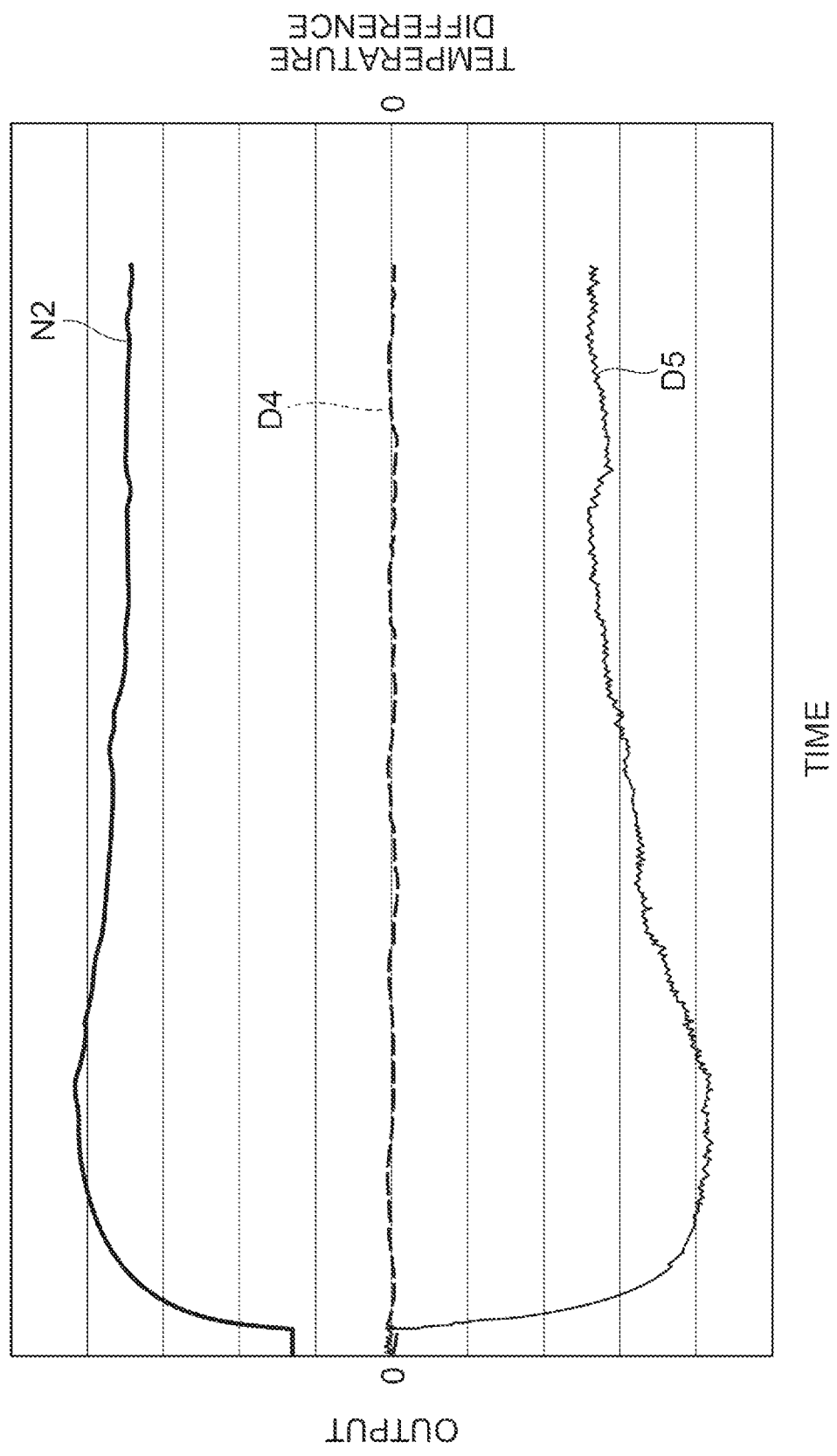
FIG. 8 is a graph illustrating a test result for unevenness of an output with respect to a change in temperature of the load cell unit.

FIG. 8 is a graph illustrating test results associated with a variation in output with respect to a change in temperature of the load cell unit. In the drawing, a waveform D4 indicates a result with the load cell unit 100 according to this embodiment, and a waveform D5 indicates a result with a load cell unit according to Comparative Example 3. The load cell unit according to Comparative Example 3 has the same configuration as the load cell unit 100, except that the temperature sensors 41 to 43, the balanced temperature compensating unit 53a, and the unbalanced temperature compensating unit 53b are not provided. In this test, a temperature difference N2 between the free-end block and the fixed-end block can be changed as illustrated in the drawing by heating the fixed-end block of the distortional member using a heater. As illustrated in FIG. 8, in Comparative Example 3, the output varies with occurrence of the temperature difference N2. On the other hand, it can be ascertained that it is possible to greatly curb the variation in the load cell unit 100.

Figure 9:
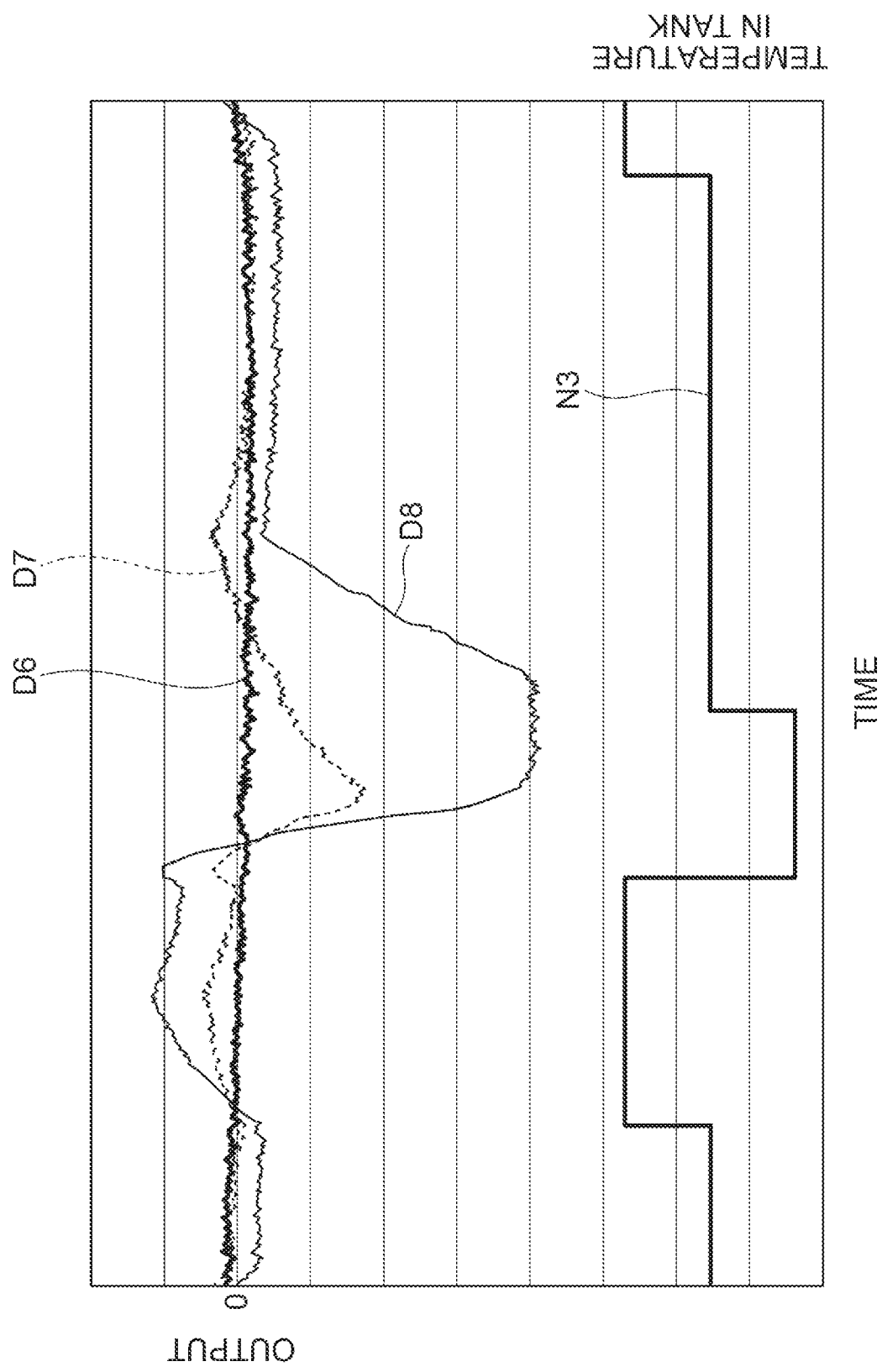
FIG. 9 is a graph illustrating a test result for unevenness of an output with respect to a change in temperature of the load cell unit.

FIG. 9 is a graph illustrating test results associated with a variation in output with respect to a change in temperature of the load cell unit. In the drawing, a waveform D6 indicates a result with the load cell unit 100 according to this embodiment, a waveform D7 indicates a result with a load cell unit according to Comparative Example 4, and a waveform D8 indicates a result with a load cell unit according to Comparative Example 5. The load cell unit according to Comparative Example 4 has the same configuration as the load cell unit 100, except that the second temperature sensor 42, the third temperature sensor 43, and the unbalanced temperature compensating unit 53b are not provided. The load cell unit according to Comparative Example 5 has the same configuration as the load cell unit 100, except that the temperature sensors 41 to 43, the balanced temperature compensating unit 53a, and the unbalanced temperature compensating unit 53b are not provided. In the test, various load cell units were set in a thermostatic bath and a bath temperature N3 was changed in a substantially stepped shape of normal temperature→high temperature→low temperature→normal temperature. As illustrated in FIG. 9, when the bath temperature N3 changes suddenly, the waveform D7 and the waveform D8 (Comparative Example 4 and Comparative Example 5) indicate that the output varies temporarily. On the other hand, the output value (the waveform D6) in this embodiment varies less than those in the waveform D7 and the waveform D8. With the load cell unit 100, it can be ascertained that it is possible to greatly curb the variation and to achieve excellent variation improvement. The output value in this embodiment varies less than the output value (the waveform D1) in the first embodiment (see FIG. 5). In FIGS. 5 and 9, the scales in the vertical axis (output) are the same.

Third Embodiment

A third embodiment will be described below. In description of this embodiment, only differences from the first embodiment will be described and description thereof will not be repeated.

Figure 10:
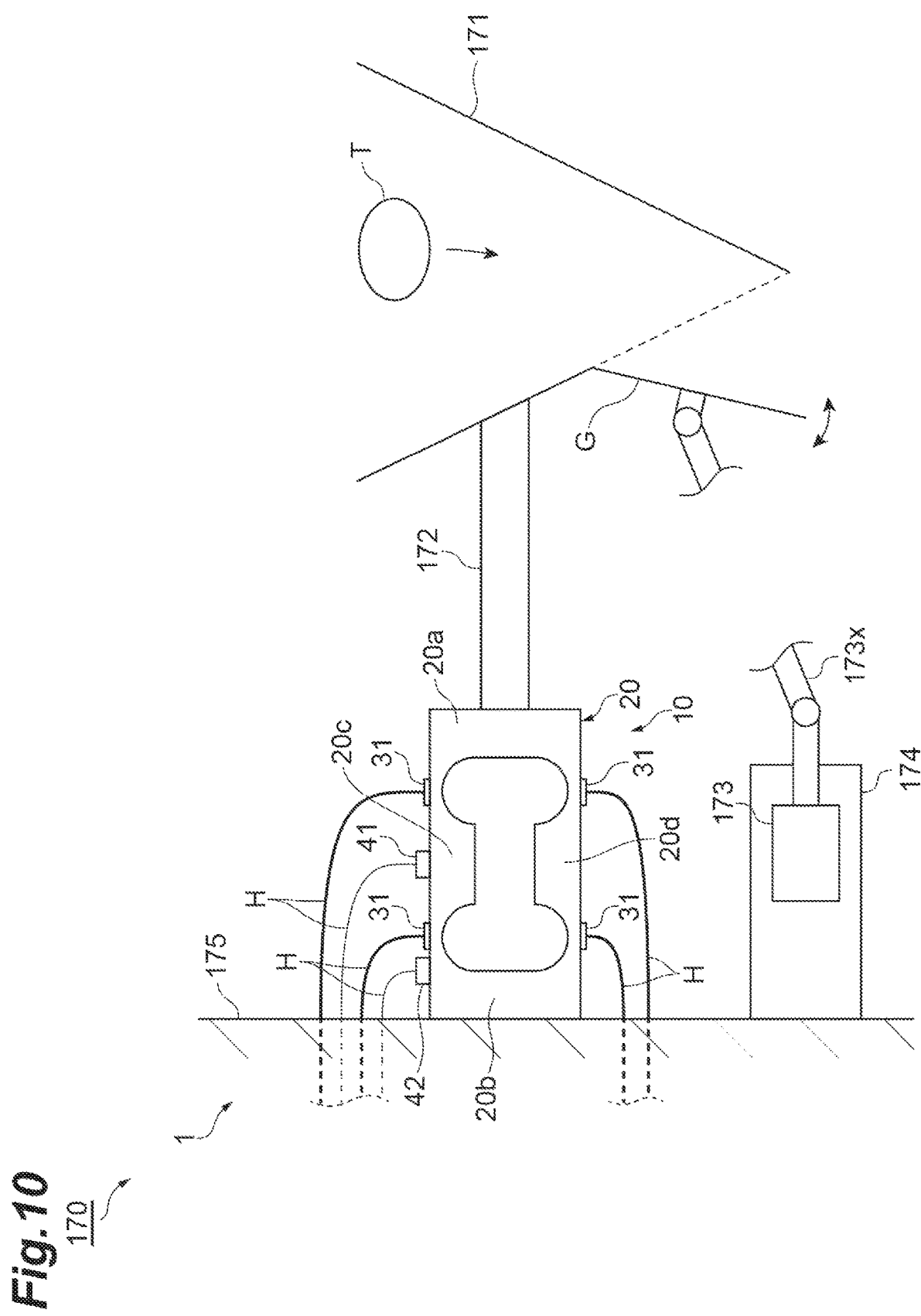
FIG. 10 is a diagram illustrating a configuration of weighing equipment according to a third embodiment.

FIG. 10 is a diagram illustrating a configuration of weighing equipment 170 according to the third embodiment. The weighing equipment 170 illustrated in FIG. 10 is, for example, a device that is used for combined weighing equipment. The weighing equipment 170 is different from the weighing equipment 70 (see FIG. 1), in that a hopper unit 171, a support 172, a drive unit 173, and a main body 174 are provided instead of the transportation conveyer 71, the drive unit 72, the first frame unit 73, the leg unit 74, and the second frame unit 75 (see FIG. 1).

The hopper unit 171 includes a gate G, causes an article T input from the outside to stay therein temporarily, and then discharges the article T. The support 172 supports the hopper unit 171. The drive unit 173 drives the gate G to be opened and closed via a link 173x. When the gate G is closed, the drive unit 173 and the gate G are separated from each other such that they do not interfere with weighing. The drive unit 173 includes, for example, a motor. The main body 174 accommodates the drive unit 173. In this embodiment, the free-end block 20a is connected to the support 172 and a weight of an article T staying in the hopper unit 171 is applied thereto. The fixed-end block 20b is connected to the main body 174 in which the drive unit 173 is accommodated via a frame 175.

As described above, the aforementioned operations and advantages of realizing stable high-precision weighing can also be achieved in this embodiment.

In this embodiment, the second temperature sensor 42 is provided in the fixed-end block 20b. Since the drive unit 173 serving as a heat source is provided on the fixed-end block 20b side, the fixed-end block 20b is the side close to a heat source. That is, the second temperature sensor 42 is disposed at the free-end block 20a to which heat from the drive unit 173 serving as a heat source is more conducted than to the free-end block 20a. With this configuration, it is possible to immediately detect heat conduction of heat from a heat source and to perform early compensation for thermal non-equilibrium which occurs in the distortional member 20 due to the heat source. In this embodiment, a configuration including three temperature sensors 41 to 43 like the second embodiment may be employed.

While embodiments of the invention have been described above, an aspect of the invention is not limited to the embodiments and can be modified in various forms without departing from the gist of the invention.

In the aforementioned embodiments, the first temperature sensor 41 may be disposed at the lower beam portion 20d. In the aforementioned embodiment, at least one of the first temperature sensor 41, the second temperature sensor 42, and the third temperature sensor 43 may be disposed on the bottom surface of the distortional member 20 or may be disposed on a side surface of the distortional member 20. In the aforementioned embodiments, at least one of the first temperature sensor 41, the second temperature sensor 42, and the third temperature sensor 43 may be disposed at a position other than the center of the distortional member 20 in the width direction.

In the aforementioned embodiments, the compensation precision may be further increased by increasing the order of at least one of Expression (2) and Expression (3). In the aforementioned embodiments, the load cell unit 1 or 100 is applied to the weighing equipment 70 or 170, but the invention is not limited thereto. The load cell unit according to an aspect of the invention can be applied to various types of known weighing equipment.

The constituents in the aforementioned embodiments and modified examples are not limited to the aforementioned materials and shapes, and various materials and shapes can be applied thereto. The constituents in the aforementioned embodiments and modified examples can be arbitrarily applied to the constituents in other embodiments or modified examples. Some constituents in the aforementioned embodiments and modified examples can be appropriately omitted without departing from the gist of an aspect of the invention.

According to some aspects of the invention, it is possible to provide a load cell unit and weighing equipment that can realize stable high-precision weighing.

What is claimed is:

1. A load cell unit comprising:
   a load cell that is provided with a distortional member including a free-end block, a fixed-end block, an upper beam portion connecting an upper end of the free-end block and an upper end of the fixed-end block, and a lower beam portion connecting a lower end of the free-end block and a lower end of the fixed-end block;
   a first temperature sensor that is disposed at the upper beam portion or the lower beam portion; and
   a second temperature sensor that is attached to one of the free-end block and the fixed-end block of the distortional member.

2. The load cell unit according to claim 1, wherein the first temperature sensor and the second temperature sensor are provided together on one of a top surface and a bottom surface of the distortional member.

3. The load cell unit according to claim 1, wherein the first temperature sensor and the second temperature sensor are disposed at the center of the distortional member in a width direction crossing a direction from the free-end block to the fixed-end block and crossing a vertical direction.

4. The load cell unit according to claim 1, further comprising a third temperature sensor that is provided on the other of the free-end block and the fixed-end block.

5. The load cell unit according to claim 1, wherein the load cell includes a sensor unit that outputs a weighed value based on an amount of distortion of the distortional member as an analog value, and
   wherein the load cell unit further comprises:
      a converter unit that converts the analog value output from the sensor unit to a digital value; and
      a temperature difference compensating unit that performs temperature compensation in an unbalanced state on the digital value acquired from the converter unit based on a temperature difference between a first temperature detected by the first temperature sensor and a second temperature detected by the second temperature sensor.

6. The load cell unit according to claim 4, further comprising:
- a sensor unit that outputs a weighed value based on an amount of distortion of the distortional member as an analog value;
- a converter unit that converts the analog value output from the sensor unit to a digital value; and
- a temperature difference compensating unit that performs temperature compensation in an unbalanced state on the digital value acquired from the converter unit based on a temperature difference between a first temperature detected by the first temperature sensor and a second temperature detected by the second temperature sensor and a temperature difference between the first temperature and a third temperature detected by the third temperature sensor.

7. The load cell unit according to claim 5, further comprising a temperature compensating unit that performs temperature compensation in a steady state on the digital value which is acquired from the converter unit and which is not yet compensated for by the temperature difference compensating unit on the basis of the first temperature.

8. The load cell unit according to claim 1, wherein the second temperature sensor is disposed at one of the free-end block and the fixed-end block that is closer to a heat source.

9. The load cell unit according to claim 1, wherein the second temperature sensor is disposed at the fixed-end block.

10. Weighing equipment comprising:
the load cell unit according to claim 1;
- a transportation conveyer that transports an article which is to be weighed in a state in which the article is placed on a transportation surface;
- a drive unit that drives the transportation conveyer;
- a first frame unit that supports the transportation conveyer and the drive unit;
- a leg unit; and
- a second frame unit that is supported by the leg unit,
wherein the free-end block is connected to the first frame unit and a weight of the article transported by the transportation conveyer is applied thereto,
wherein the fixed-end block is connected to the second frame unit, and
wherein the second temperature sensor is disposed at the free-end block.

11. Weighing equipment comprising:
the load cell unit according to claim 1;
- a hopper unit that includes a gate, temporarily holds an article which is input from outside, and then discharges the article;
- a support that supports the hopper unit;
- a drive unit that drives the gate to be opened and closed; and
- a main body that accommodates the drive unit therein,
wherein the free-end block is connected to the support and a weight of the article held in the hopper unit is applied thereto,
wherein the fixed-end block is connected to the main body, and
wherein the second temperature sensor is disposed at the fixed-end block.

* * * * *